(12) United States Patent
Cuadra et al.

(10) Patent No.: US 7,813,150 B2
(45) Date of Patent: **\*Oct. 12, 2010**

(54) COMPENSATION FOR PARAMETER VARIATIONS IN A FEEDBACK CIRCUIT

(75) Inventors: Jason E. Cuadra, San Jose, CA (US); Arthur B. Odell, Cupertino, CA (US); William M. Polivka, Campbell, CA (US)

(73) Assignee: Power Integrations, Inc., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/428,406

(22) Filed: Apr. 22, 2009

(65) Prior Publication Data

US 2009/0201701 A1  Aug. 13, 2009

Related U.S. Application Data

(63) Continuation of application No. 10/940,061, filed on Sep. 13, 2004, now Pat. No. 7,535,735.

(51) Int. Cl.
   *H02M 3/335*  (2006.01)
(52) U.S. Cl. ............... 363/21.15; 323/902; 323/907
(58) Field of Classification Search ............... 323/907, 323/902; 363/21.12–21.14, 21.17–21.18, 363/19, 21.07, 23, 18; 327/83, 513; 330/289, 330/266
See application file for complete search history.

(56) References Cited

U.S. PATENT DOCUMENTS

| 4,749,889 A | 6/1988 | Lagoni et al. |
| 4,801,980 A | 1/1989 | Arai et al. |
| 4,847,547 A | 7/1989 | Eng, Jr. |
| 5,408,402 A | 4/1995 | Nonnenmacher |
| 5,515,263 A | 5/1996 | Otake et al. |

(Continued)

FOREIGN PATENT DOCUMENTS

DE   42 10 785 C1   9/1993

(Continued)

OTHER PUBLICATIONS

European Search Report—Application No. EP 05 25 4366, dated Jan. 6, 2006.

(Continued)

*Primary Examiner*—Harry Behm
(74) *Attorney, Agent, or Firm*—Blakely Sokoloff Taylor & Zafman, LLP (57) ABSTRACT

Techniques to compensate for parameter variations in a feedback circuit are disclosed. In one embodiment, a regulator circuit includes an energy source coupled to output a generated current in response to a control current. A feedback resistor is coupled to an output of the regulator circuit. The feedback resistor is coupled to conduct a feedback current responsive to the output of the regulator circuit. A current amplifier is coupled to the feedback resistor to generate the control current in response to the feedback current. A compensation network is coupled to the current amplifier to adjust the control current in response to an extrinsic parameter of the regulator circuit. The compensation network includes a transistor and first, second and third resistors. The first resistor is coupled between the feedback resistor and a collector of the transistor. The second resistor coupled between the collector and the base of the transistor. The third resistor coupled between the base and an emitter of the transistor.

13 Claims, 5 Drawing Sheets

U.S. PATENT DOCUMENTS

| | | | |
|---|---|---|---|
| 5,675,485 A | 10/1997 | Seong | |
| 5,786,685 A | 7/1998 | Lange et al. | |
| 5,933,334 A | 8/1999 | Sula | |
| 5,995,384 A * | 11/1999 | Majid et al. | 363/21.18 |
| 6,023,185 A | 2/2000 | Galipeau et al. | |
| 6,300,818 B1 | 10/2001 | Mao | |
| 6,344,770 B1 | 2/2002 | Zha et al. | |
| 7,034,618 B2 | 4/2006 | Barabash | |
| 2003/0021129 A1 | 1/2003 | Balakrishnan et al. | |

FOREIGN PATENT DOCUMENTS

| | | |
|---|---|---|
| JP | 52-057791 | 5/1977 |
| JP | 60187869 A * | 9/1985 |
| JP | 62-239865 | 10/1987 |
| JP | 08080037 A * | 3/1996 |
| JP | 2002-136123 | 5/2002 |

OTHER PUBLICATIONS

European Examination Report—Application No. EP 05 25 4366, dated May 7, 2008.

European Search Report—Application No. EP 07 02 4070, dated Mar. 28, 2008.

* cited by examiner

COMPENSATION FOR PARAMETER VARIATIONS IN A FEEDBACK CIRCUIT

REFERENCE TO RELATED APPLICATION

The present application is a continuation of U.S. patent application Ser. No. 10/940,061, filed Sep. 13, 2004, now pending, entitled "COMPENSATION FOR PARAMETER VARIATIONS IN A FEEDBACK CIRCUIT," which is hereby incorporated by reference.

BACKGROUND OF THE INVENTION

1. Field of the Invention

The present invention relates generally to electronic circuits, and more specifically, the invention relates to electronic circuits that regulate a voltage in a closed loop feedback system.

2. Background Information

The principle of a closed loop feedback system is to reduce the difference between a measured value and a desired value of an output by controlling a source of energy that produces the output. The output is sensed to obtain a measurement. The measurement is usually proportional to the value of the sensed output. The measurement is compared to a reference. The reference is usually considered the input to the system. The difference between the measurement and the reference produces a feedback signal that reduces the difference between the measured value and the desired value of the output.

In electronic systems, the output, measurement, reference, and feedback signal may be voltage or current. Operations associated with voltage in an electronic system are sometimes associated equivalently with current instead of voltage. Practical considerations may influence whether voltage or current is preferable for a given operation. The intrinsic parameters of electronic components are those that define the fundamental properties and behavior of a component. Examples of intrinsic parameters are the resistance of a resistor, the Zener voltage of a Zener diode, and the forward voltage of a rectifier at a given forward current. Extrinsic parameters typically influence the intrinsic parameters of electronic components. Extrinsic parameters are generally environmental conditions such as for example temperature that are not intended as inputs to the system.

BRIEF DESCRIPTION OF THE DRAWINGS

The present invention detailed illustrated by way of example and not limitation in the accompanying Figures.

DETAILED DESCRIPTION

Embodiments of compensation for variations of parameters in an electronic feedback system are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of designs of feedback control systems that make the output insensitive to changes in extrinsic parameters are disclosed in this disclosure. For the purposes of this disclosure, extrinsic parameters of the system are all parameters outside the system that are not specified as inputs or outputs of the system. Extrinsic parameters are usually environmental parameters with limits specified for the design. Feedback control systems according to embodiments of the present invention satisfy design requirements that are specified to perform within a range of extrinsic parameters. Some examples of extrinsic parameters are ambient temperature, ionizing radiation, and aging in accordance with the teachings of the present invention.

Figure 1:
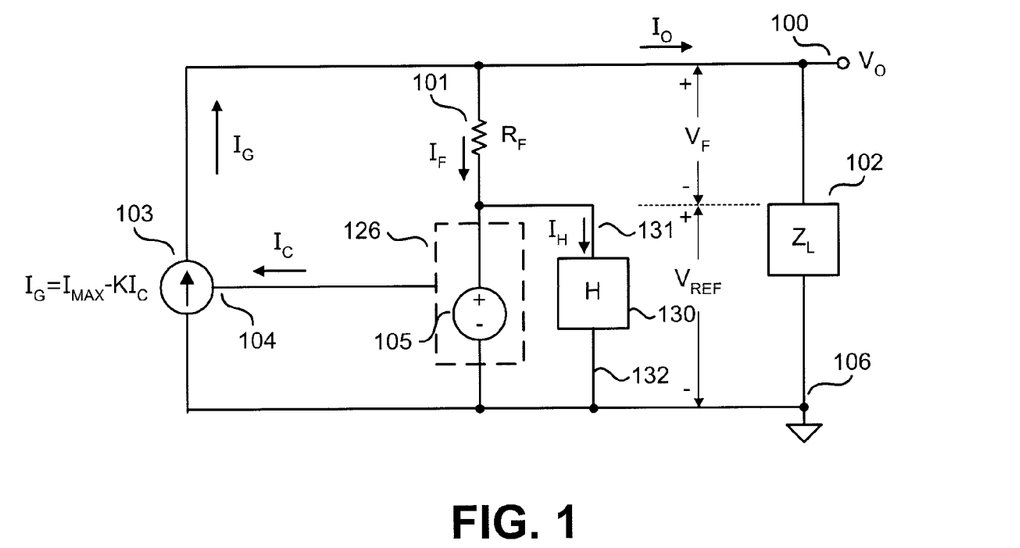
FIG. 1 is a schematic illustration of one embodiment of a voltage regulator with compensation that uses a feedback current to control an output voltage in accordance with the teachings of the present invention.

FIG. 1 is a schematic illustration of one embodiment of a voltage regulator with compensation that uses a feedback current to control an output voltage in accordance with the teachings of the present invention. In one embodiment, the voltage regulator illustrated in FIG. 1 represents components of a regulated power supply. As shown in the depicted embodiment, an energy source 103 is coupled to output a generated current $I_G$ in response to a control current $I_C$. In one embodiment, energy source 103 is for example a controlled current source. An output voltage $V_O$ is produced at an output 100 of the voltage regulator with respect to ground reference 106. The voltage regulator circuit of FIG. 1 can represent any voltage regulator without loss of generality for the purposes of this disclosure. In other embodiments, energy source 103 may represent other types of sources of continuous or switched energy, including but not limited to analog linear control and digital on/off control in accordance with the teachings of the present invention.

In one embodiment, the voltage $V_O$ at the output 100 remains substantially unchanged when a load impedance $Z_L$ 102 coupled to output 100 changes over a range of values. The difference in voltage between a voltage $V_O$ at output 100 and a reference voltage $V_{REF}$ from voltage source 105 is a feedback voltage $V_F$ that appears across a feedback resistor $R_F$ 101 to produce a feedback current $I_F$ which is conducted by the feedback resistor $R_F$ 101 in response to the voltage $V_O$ at the output 100.

In one embodiment, a current amplifier 126 is coupled to the feedback resistor $R_F$ 101 and is responsive to the feedback current. As shown in the depicted embodiment, current amplifier 126 is coupled to receive an input current that is the difference between feedback current $I_F$ and a compensation current $I_H$. The gain of the current amplifier is the ratio of an output current to an input current. In various embodiments, current amplifier 126 has a gain of greater than 1, less than 1 or equal to 1 in accordance with the teachings of the present invention. In one embodiment, control current $I_C$ is generated at an output of current amplifier 126 in response to the feedback current $I_F$ received at an input of current amplifier 126. The control current $I_C$ is received at a control input 104 of energy source 103. In one embodiment, the control current $I_C$ at control input 104 adjusts the generated current $I_G$ from energy source 103 to reduce the change in voltage $V_O$ at output 100 when the load impedance $Z_L$ 102 changes over a range of values. In the depicted embodiment, the ratio of the change in generated current $I_G$ to the change in control current $I_C$ is the control gain K of the controlled energy source 103.

In operation, where there is a change in load impedance $Z_L$ 102, then there will be a change in output current $I_O$ to maintain the output voltage at its desired value. Where there is a change in output current $I_O$, then there is a change in source current $I_G$ from current source 103 to maintain the desired value of voltage $V_O$ at output 105.

As shown in the depicted schematic, a compensation network 130 is also included in the voltage regulator embodiment of FIG. 1. In one embodiment, a compensation network is coupled between a ground terminal of the voltage regulator and an input terminal of the current amplifier 126. Without compensation network 130, if there were an undesired change in the reference voltage $V_{REF}$ from voltage source 105, an undesired change in the voltage $V_O$ at output 100 would result, even when there is no change in load impedance $Z_L$ 102. A change in an extrinsic parameter such as for example temperature may cause an undesired change in the reference voltage $V_{REF}$ from voltage source 105, or for example the value of feedback resistor $R_F$ 101, or for example the parameter $I_{MAX}$ of the controlled energy source 104, or for example the control gain K of the controlled energy source 104. Consequently, without compensation network 130, an undesired change in the voltage $V_O$ at output 100 would result, even when there is no change in load impedance $Z_L$ 102.

In one embodiment, compensation network 130 is coupled between the ground terminal of the voltage regulator and the current amplifier 126 as shown to adjust the control current $I_C$ in response to extrinsic parameters of the voltage regulator circuit in accordance with the teachings of the present invention. In the particular embodiment shown in FIG. 1, compensation network 130 is adapted to produce a compensation current $I_H$, which will affect amount of current input into current amplifier 126, which will adjust the control current $I_C$ accordingly. In one embodiment, compensation current $I_H$ changes value in response to extrinsic parameters to reduce undesirable changes to the voltage $V_O$ at the output 100 in accordance with the teachings of the present invention.

Therefore, one embodiment adjusts the control current $I_C$ to maintain the output 100 of the voltage regulator at a desired value when variations in extrinsic parameters cause properties of components in the feedback circuit to change. In the illustrated embodiment, compensation network 130 provides a desired change or adjustment to control current $I_C$ to compensate for a change in for example feedback current $I_F$, which may result from an undesired change in the value of feedback resistor $R_F$ 101 resulting from for example variations in temperature or other extrinsic parameters. Stated differently, compensation network 130 in one embodiment therefore changes or adjusts the gain of current amplifier 126 to provide the desired change in the control current $I_C$ to compensate for the change in feedback current $I_F$. In one embodiment, it could also be considered that the control gain K of the controlled energy source 103 is, in effect, adjusted with compensation current $I_H$ in adjusting control current $I_C$ response to extrinsic parameters to reduce undesirable changes to the voltage $V_O$ at the output 100 in accordance with the teachings of the present invention.

Figure 2:
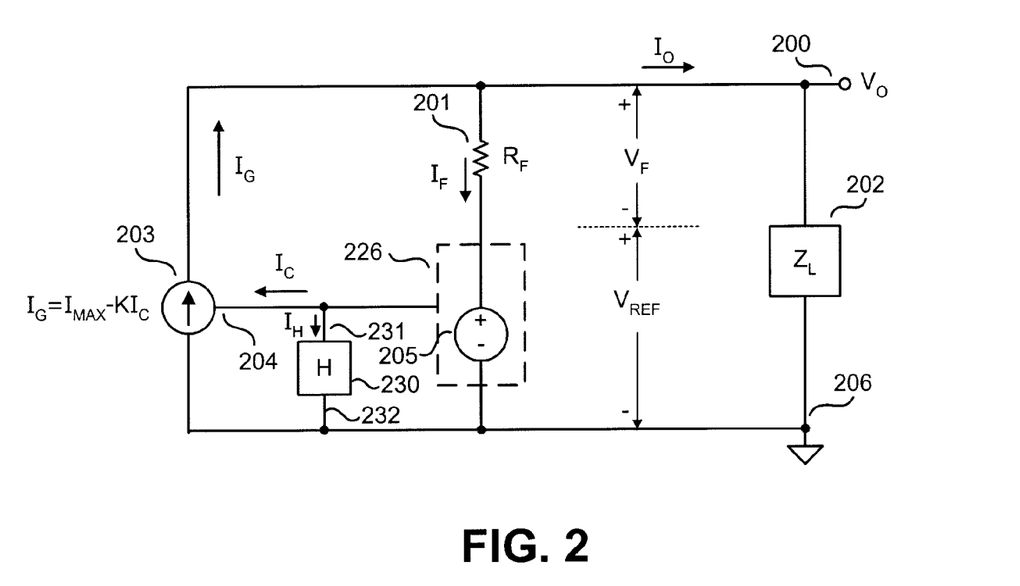
FIG. 2 is a schematic illustration of another embodiment of a voltage regulator with compensation that uses a feedback current to control an output voltage in accordance with the teachings of the present invention.

FIG. 2 is a schematic illustration of another embodiment of a voltage regulator with compensation that uses a feedback current to control an output voltage in accordance with the teachings of the present invention. As illustrated, the voltage regulator embodiment of FIG. 2 is similar to the voltage regulator embodiment of FIG. 1. For example, an energy source 203 is coupled to output a generated current $I_G$ in response to a control current $I_C$. In one embodiment, energy source 203 is for example a controlled current source. An output voltage $V_O$ is produced at an output 200 of the voltage regulator with respect to ground reference 206. The voltage $V_O$ at the output 200 remains substantially unchanged when a load impedance $Z_L$ 202 coupled to output 200 changes over a range of values. The difference in voltage between a voltage $V_O$ at output 200 and a reference voltage $V_{REF}$ from voltage source 205 is a feedback voltage $V_F$ that appears across a feedback resistor $R_F$ 201 to produce a feedback current $I_F$ which is conducted by the feedback resistor $R_F$ 201 in response to the voltage $V_O$ at the output 200.

As shown in the depicted embodiment, a current amplifier 226 is coupled to the feedback resistor $R_F$ 201 and receives feedback current $I_F$. In one embodiment, the source of control current $I_C$ is produced by an output of current amplifier 226 in response to the feedback current $I_F$ received at an input of current amplifier 226. The control current $I_C$ is received at a control input 204 of energy source 203. In the illustrated embodiment, the control current $I_C$ at control input 204 adjusts the generated current $I_G$ from energy source 203 to reduce the change in voltage $V_O$ at output 200 when the load impedance $Z_L$ 202 changes over a range of values.

In one embodiment, a compensation network 230 is also included and is coupled between a ground terminal of the voltage regulator and the current amplifier 226. In the embodiment shown in FIG. 2, compensation network 230 is coupled to an output terminal of current amplifier 226 to adjust the control current $I_C$. Similar to FIG. 1, if there were, for example, a change in an extrinsic parameter of the system such as for example temperature, an undesired change in the reference voltage $V_{REF}$ from voltage source 105, or for example the value of feedback resistor $R_F$ 101, or for example the parameter $I_{MAX}$ of the controlled energy source 104, or for example the control gain K of the controlled energy source 104 may result. Consequently, without compensation network 230, an undesired change in the voltage $V_O$ at output 200 would result, even when there is no change in load impedance $Z_L$ 202.

As shown in the illustrated embodiment, compensation network 230 is coupled to the current amplifier 226 between the output of the current amplifier 226 and the input 204 of the energy source 203 to adjust the control current $I_C$ in response to extrinsic parameters of the voltage regulator in accordance with the teachings of the present invention. In the particular embodiment shown in FIG. 2, compensation network 230 is adapted to produce a compensation current $I_H$, which will affect the amount of current at the output of current amplifier 226, which will adjust the control current $I_C$ accordingly. Therefore, in the illustrated embodiment, compensation current $I_H$ changes value in response to extrinsic parameters to reduce undesirable changes to the voltage $V_O$ at the output 200 in accordance with the teachings of the present invention. In one embodiment, it could also be considered that the control gain K of the controlled energy source 203 is, in effect, adjusted with compensation current $I_H$ adjusting control current $I_C$ in response to extrinsic parameters to reduce undesirable changes to the voltage $V_O$ at the output 200 in accordance with the teachings of the present invention.

Figure 3:
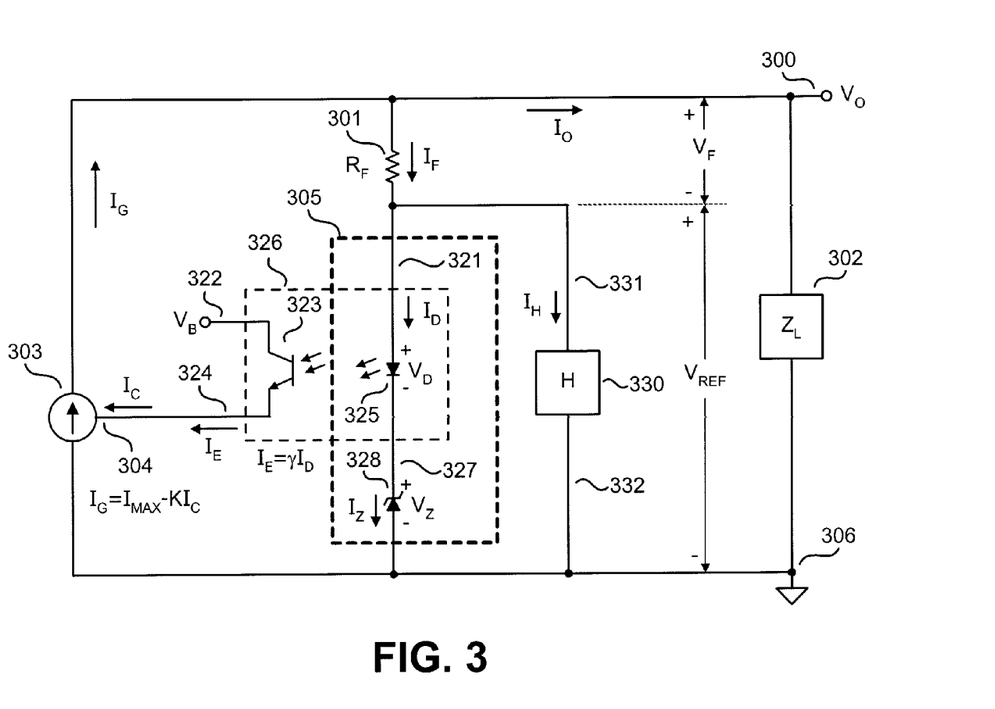
FIG. 3 is a schematic illustration with increased detail of a current amplifier included in one embodiment of a voltage regulator with compensation that uses a feedback current to control an output voltage in accordance with the teachings of the present invention.

FIG. 3 is a schematic illustration of a voltage regulator shown with the increased detail of an included current amplifier with compensation that uses a feedback current to control an output voltage in accordance with the teachings of the present invention. The illustrated embodiment shows that semiconductor components are utilized to produce the reference voltage $V_{REF}$. Semiconductor components also perform the function of the current amplifier that couples feedback current $I_F$ to the control input 304 of the controlled energy source 303. In one embodiment, the control input 304 of energy source 303 may represent a terminal of an integrated circuit that controls the operation of a power supply in accordance with the teachings of the present invention.

The embodiment of FIG. 3 also shares similarities with the embodiment illustrated in FIG. 1. However, the embodiment of voltage source 305 illustrated in FIG. 3 includes a current amplifier 326, which is illustrated as including an optocoupler as shown. In one embodiment, the optocoupler of current amplifier 326 includes photodiode 325, which has a voltage drop $V_D$ from its anode 321 to its cathode 327 when there is a photodiode current $I_D$ from anode 321 to cathode 327. The cathode 327 of photodiode 325 is coupled to the cathode of Zener diode 328, which is also included in one embodiment of voltage source 305. The anode of Zener diode 328 is coupled to a ground reference 306 of the voltage regulator. In the illustrated embodiment, Zener diode 328 produces a voltage $V_Z$ with respect to the ground reference 306 when there is a Zener current $I_Z$. In one embodiment, the sum of the photodiode voltage $V_D$ and the Zener voltage $V_Z$ is the reference voltage $V_{REF}$.

In one embodiment, the voltage $V_D$ on the photodiode 325 and the voltage $V_Z$ on the Zener diode 328 are affected by extrinsic parameters such as for example temperature. In the embodiment illustrated in FIG. 3, feedback resistor $R_F$ 301 represents the resistance of a discrete resistor plus the internal resistance of the photodiode 305 and the Zener diode 308.

In the illustrated embodiment, the voltage source 305, which includes the optocoupler of current amplifier 326 has an input current $I_D$ and an output current $I_E$. The ratio of output current $I_E$ to input current $I_D$ is the current gain γ. In other embodiments, other devices or circuits can also be used for voltage source 305 in accordance with the teachings of the present invention. For example, other devices such as bipolar transistors can be adapted to provide the function of a current amplifier circuit in accordance with the teachings of the present invention. All such circuits will have an input current, an output current, and a current gain γ that is the ratio of the output current to the input current in accordance with the teachings of the present invention.

In the illustrated embodiment, the optocoupler of current amplifier 326 also includes a phototransistor 323 as shown. The collector 322 of phototransistor 323 is coupled to a bias voltage $V_B$. The emitter 324 of phototransistor 323 is coupled to the control input 304 of energy source 303. Feedback current $I_F$ in feedback resistor $R_F$ 301 is the same current as photodiode current $I_D$ in photodiode 325. The optical coupling between photodiode 325 and phototransistor 323 produces an emitter current $I_E$ at the emitter 324 of phototransistor 323. The ratio γ of emitter current $I_E$ to photodiode current $I_D$ is a property of the particular optocoupler that depends on many conditions that include magnitude of the photodiode current, temperature, and age of the optocoupler. In the illustrated embodiment, the control current $I_C$ is the emitter current $I_E$.

As also shown in the embodiment of FIG. 3, a compensation network H 330 having a first terminal 331 and a second terminal 332 is coupled between the optocoupler of current amplifier 326 and ground 306 to produce a compensation current $I_H$ to adjust the control current $I_C$ in response to an extrinsic parameter of the voltage regulator. In the depicted embodiment, compensation network H 330 allows the feedback current $I_F$ to be different from the photodiode current $I_D$ that is the input to the current amplifier 305. Compensation current $I_H$ changes value to reduce undesirable changes to the voltage $V_O$ at the output 300 when there are undesirable changes to extrinsic parameters of the feedback circuit of the voltage regulator in accordance with the teachings of the present invention.

A variety of embodiments may be employed when implementing compensation network H 300 in accordance with the teachings of the present invention. The various embodiments produce the desired compensation current $I_H$ in response to the undesirable changes in extrinsic parameters that produce the undesirable changes in the feedback circuit. In various embodiments, compensation network H 300 is of substantially low cost and/or may operate with low values of reference voltage $V_{REF}$, such as for example less than one volt. In one embodiment, output voltage $V_O$ at the output 300 remains substantially constant over a range of conditions that include changes in temperature.

To illustrate, consider that the reference voltage $V_{REF}$ has a value $V_{REF1}$ at a temperature $T_1$ and a value $V_{REF2}$ at a temperature $T_2$. The reference voltage $V_{REF}$ will change by an amount $\Delta V_{REF}$ that is given by $$\Delta V_{REF} = V_{REF2} - V_{REF1} \qquad \text{(Equation 1)}$$

For the output voltage $V_O$ to remain unchanged at the two temperatures, the feedback voltage $V_F$ changes from a value $V_{F1}$ at temperature $T_1$ to a value $V_{F2}$ at temperature $T_2$. The feedback voltage $V_F$ changes by an amount $\Delta V_F$ that is given by $$\Delta V_F = V_{F2} - V_{F1} \qquad \text{(Equation 2)}$$

Since the $\Delta V_{REF}$ and $\Delta V_F$ sum to zero for $V_O$ to be unchanged, $$\Delta V_F = -\Delta V_{REF} \qquad \text{(Equation 3)}$$

The change in feedback voltage $\Delta V_F$ changes in the feedback current $\Delta I_F$, which is the difference between the feedback current $I_{F2}$ at temperature $T_2$ and the feedback current $I_{F1}$ at temperature $T_1$.

$$\Delta I_F = I_{F2} - I_{F1} \qquad \text{(Equation 4)}$$

Accordingly, the energy source 303 changes its current $I_G$ by the same amount so that the current $I_O$ in the load impedance $Z_L$ 302 does not change.

In one embodiment, the changes to the currents are provided by the change in the compensation current $I_H$ in accordance with the teachings of the present invention. The current $I_H$ from compensation network 330 changes to keep the output voltage $V_O$ the same value at temperatures $T_1$ and $T_2$. Therefore, compensation current $I_H$ changes by the amount $\Delta I_H$ $$\Delta I_H = I_{H2} - I_{H1} \tag{Equation 5}$$

where $I_{H2}$ is the compensation current $I_H$ at temperature $T_2$ and $I_{H1}$ is the compensation current $I_H$ at temperature $T_1$. The change $\Delta I_H$ in compensation current is given by the expression $$\Delta I_H = \Delta I_F \left(1 + \frac{1}{K\gamma}\right) \tag{Equation 6}$$

where $\gamma$ is the gain of the optocoupler, and K is the control gain of the controlled energy source 303.

In one embodiment, $\gamma$ is equal to approximately 1 if the current amplifier includes a typical optocoupler. For other current amplifier embodiments, $\gamma$ can take on values from very large to very small depending on the design in accordance with the teachings of the present invention. The control gain K of the controlled energy source 303 can take on a range of values, depending on the design and the nature of the circuit. High values of the control gain K can justify simplifying approximations of the expressions presented in this disclosure. For example, Equation 6 shows that $\Delta I_H$ is approximately the same as $\Delta I_F$ when K is large.

In various embodiments, compensation network H may be employed according to a variety of techniques in accordance with the teachings of the present invention. For example, in one embodiment, compensation network H includes a thermistor or passive resistor. The thermistor exhibits varying resistance values based on extrinsic parameters as discussed above in accordance with the teachings of the present invention. In another embodiment, the compensation network H includes for example a bipolar transistor.

Figure 4:
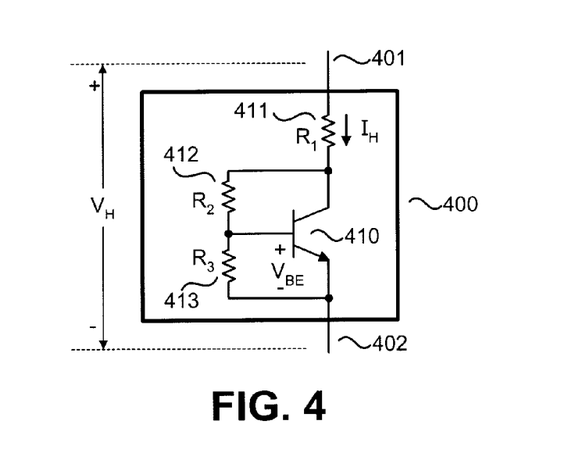
FIG. 4 is a schematic illustration of one embodiment of a compensation network that compensates for variations in temperature in accordance with the teachings of the present invention.

To illustrate, FIG. 4 is a schematic illustration of another embodiment of a compensation network that compensates for variations in temperature in accordance with the teachings of the present invention. In particular FIG. 4 illustrates an embodiment of the compensation network H shown in FIGS. 1-3 that provides the compensation current $I_H$ with the desired features of low cost and the ability to operate with low values of the reference voltage $V_{REF}$. In the illustrated embodiment, compensation network H 400 of FIG. 4 has a first terminal 401 and a second terminal 402. A voltage $V_H$ at the first terminal 401 with respect to the second terminal 402 produces a compensation current $I_H$.

In one embodiment, compensation network 400 includes a transistor 410 and first, second and third resistors 411, 412 and 413. The first resistor 411 is coupled between the feedback resistor and a collector of the transistor 410. The second resistor 412 is coupled between the collector and the base of the transistor 410. The third resistor 413 is coupled between the base and an emitter of the transistor 410. In the embodiment depicted in FIG. 4, transistor 410 is an NPN bipolar transistor. Resistor R1 411 is coupled from first terminal 401 of compensation network H 400 to the collector of transistor 410. Resistor R2 412 is coupled from the collector of transistor 410 to the base of transistor 410. Resistor R3 413 is coupled from the base of transistor 410 to the emitter of transistor 410. The emitter of transistor 410 is coupled to the second terminal 412 of network H 400.

The embodiment of network 400 in FIG. 4 allows a designer to exploit the behavior of the variation in the voltage $V_{BE}$ between the base of transistor 410 and the emitter of transistor 410 to set the desired change $\Delta I_H$ in compensation current $I_H$ under the influence of a voltage $V_H$ at a first terminal 401 with respect to a second terminal 402. The compensation current $I_H$ in FIG. 4 is given by the expression $$I_H = \frac{V_H - V_{BE}\left[1 + \frac{R_2}{R_3}\left(\frac{\beta}{\beta+1}\right)\right]}{R_1 + \frac{R_2}{\beta+1}} \tag{Equation 7}$$

where $\beta$ is the ratio of collector current to base current of the transistor 410. In one embodiment, the voltage $V_H$ is sufficiently greater than the base to emitter voltage $V_{BE}$ to allow proper operation of the transistor 410. In one embodiment, compensation network H 400 can operate satisfactorily when voltage $V_H$ is less than typically one volt.

If the voltage $V_{BE}$ from base to emitter of transistor 410 changes from a value $V_{BE1}$ at temperature $T_1$ to a value $V_{BE2}$ at a temperature $T_2$, then the change $\Delta V_{BE}$ is given by $$\Delta V_{BE} = V_{BE2} - V_{BE1} \tag{Equation 8}$$

If the voltage $V_H$ from terminal 401 with respect to terminal 402 changes from a value $V_{H1}$ at temperature $T_1$ to a value $V_{H2}$ at a temperature $T_2$, then the change $\Delta V_H$ is given by $$\Delta V_H = V_{H2} - V_{H1} \tag{Equation 9}$$

The change in compensation current that corresponds to a change in $V_H$ with a corresponding change in $V_{BE}$ is given by the expression $$\Delta I_H = \frac{\Delta V_H - \Delta V_{BE}\left[1 + \frac{R_2}{R_3}\left(\frac{\beta}{\beta+1}\right)\right]}{R_1 + \frac{R_2}{\beta+1}} \tag{Equation 10}$$

In one embodiment, when the compensation circuit 400 in FIG. 4 is adapted to the compensation network H 330 in FIG. 3, the relationship to compensate for changes in the reference voltage $V_{REF}$ when K and $\gamma$ remain constant is $$\frac{\Delta V_{REF}}{\Delta V_{BE}} = \frac{1 + \frac{R_2}{R_3}\left(\frac{\beta}{\beta+1}\right)}{1 + \frac{1}{R_F}\left(R_1 + \frac{R_2}{\beta+1}\right)\left(1 + \frac{1}{K\gamma}\right)} \tag{Equation 11}$$

Values are selected for resistors $R_1$, $R_2$, and $R_3$ in Equation 10 to achieve the desired change $\Delta I_H$ in compensation current $I_H$ while reducing the dependence on the transistor parameter $\beta$. It is noted that the compensation network H 400 of FIG. 4 allows the designer to select components with characteristics to adjust the circuit to be substantially optimized for a design for a particular application.

Therefore, in one embodiment, with compensation network H 400, a simple circuit having few components is added in accordance with the teachings of the present invention to reduce the change in an output voltage or an output current between two extremes of temperature. In one embodiment, the compensation network H 400 uses the natural variation of the voltage on a junction of bipolar transistor 410 to produce a change in the control current $I_C$ that compensates for a change in reference voltage $V_{REF}$ in accordance with the teachings of the present invention.

Figure 5:
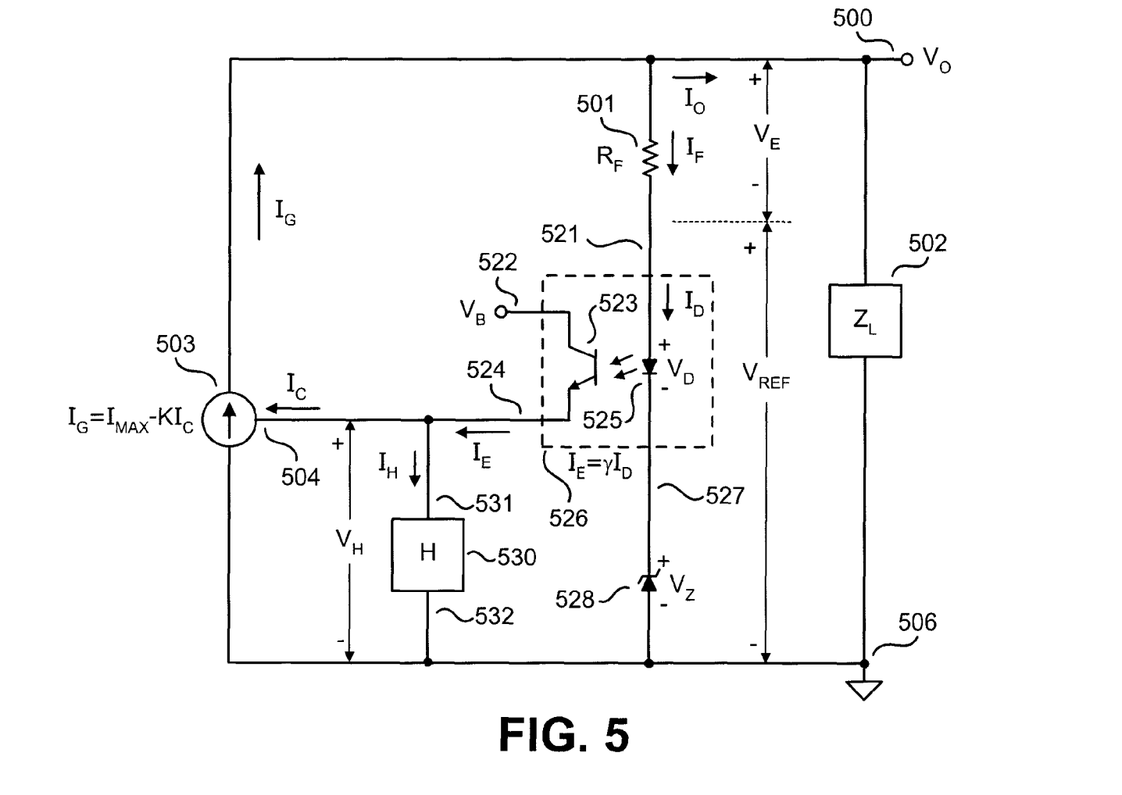
FIG. 5 is a schematic illustration with increased detail of a current amplifier included in another embodiment of a voltage regulator with compensation that uses a feedback current to control an output voltage in accordance with the teachings of the present invention.

FIG. 5 shows another embodiment of the invention, which includes the compensation network H 530 coupled to the output 524 of the current amplifier 526. One advantage of the embodiment of FIG. 5 is that there is an additional degree of freedom in the design, namely the voltage $V_H$ can be varied to control the compensation current $I_H$ in response to undesirable changes in extrinsic parameters. With proper variation of $V_H$, the compensation network H 530 could be a simple constant resistance in accordance with the teachings of the present invention.

In an embodiment in which the compensation network H 530 is a passive resistor $R_H$, the voltage $V_H$ determines the required compensation current $I_H$ for a given value of $R_H$. When the network H 530 is a passive resistor, the required change $\Delta I_H$ in compensation current is provided by a change in $V_H$, where $V_H$ has a value $V_{H1}$ at temperature $T_1$ and a value $V_{H2}$ at temperature $T_2$. In one embodiment, voltage $V_H$ at control input 504 can be adapted have a value that depends on temperature or other extrinsic parameter, particularly if the embodiment of controlled energy source 503 includes the design of an integrated circuit in accordance with the teachings of the present invention.

In another embodiment, it is not necessary to change the value of $V_H$ to obtain the desired change $\Delta I_H$. In particular, in one embodiment the compensation network H 530 can include a resistor that changes value in accordance with temperature, such as for example as a thermistor.

In the embodiment of FIG. 5, a change in feedback voltage $\Delta V_F$ causes a change in the feedback current $\Delta I_F$. The change in feedback current $\Delta I_F$ causes changes to the control current $I_C$ and the emitter current $I_E$ of the phototransistor 523. In one embodiment, the control current $I_C$ is adjusted by the change in the compensation current $I_H$ in accordance with the teachings of the present invention. If the ratio $\gamma$ of emitter current $I_E$ to the photodiode current $I_D$ of optocoupler 526 is the same at temperatures $T_1$ and $T_2$, then the current $I_H$ from the network H in 530 changes to keep the output voltage $V_O$ the same value at temperatures $T_1$ and $T_2$. The change $\Delta I_H$ in compensation current is given by the expression $$\Delta I_H = \Delta I_F \left( \gamma + \frac{1}{K} \right) \qquad \text{(Equation 12)}$$

where $\gamma$ is the gain of the optocoupler 526, and K is the control gain of the controlled energy source 503.

In one embodiment, the compensation network 400 embodiment illustrated in FIG. 4 may be employed to provide the compensation current $I_H$ in the embodiment of FIG. 5. Accordingly, the relationship to compensate for changes in the reference voltage $V_{REF}$ when $V_H$, K, and $\gamma$ remain constant is $$\frac{\Delta V_{REF}}{\Delta V_{BE}} = \left( \frac{R_F}{R_1 + \frac{R_2}{\beta+1}} \right) \left( \frac{1 + \frac{R_2}{R_3}\left(\frac{\beta}{\beta+1}\right)}{\gamma + \frac{1}{K}} \right) \qquad \text{(Equation 13)}$$

According to various embodiments, the compensation network H can contain a variety of passive and active components to provide the change in $\Delta I_H$ in compensation current under the influence of the voltage $V_H$ when the compensation network H is coupled to either the input of the current amplifier or the output of the current amplifier in accordance with the teachings of the present invention.

In other embodiments, it is not necessary to include a current amplifier in a regulator circuit to realize the benefits of the method and apparatus disclosed in this disclosure in accordance with the teachings of the present invention. For example, elimination of the current amplifier in FIG. 5 by removal of the Zener diode 528 and by connection of the input 521 to the output 524 does not change the fundamental relationships between the parameters of interest. All the previous expressions remain valid with $V_{REF}$ determined by the voltage $V_H$, and with $\gamma=1$.

In another embodiment of the invention, there is no compensation network H. For example, in one embodiment, the circuit in FIG. 3 is adapted without compensation network H 330 to keep the voltage $V_O$ at output 300 substantially unchanged when there is an undesirable change in the reference voltage $V_{REF}$. To accomplish the corresponding change in $I_G$, the control gain K of the controlled energy source 303 can be changed from a first value $K_1$ at temperature $T_1$ to a second value $K_2$ at temperature $T_2$. Also, the ratio $\gamma$ of emitter current $I_E$ to photodiode current $I_D$ of the optocoupler 326 can change from a first value $\gamma_1$ at temperature $T_1$ to a second value $\gamma_2$ at temperature $T_2$. In such an embodiment, the relationship $$\frac{I_{F2}}{I_{F1}} = \frac{K_1 \gamma_1 + 1}{K_2 \gamma_2 + 1} \qquad \text{(Equation 14)}$$

is maintained to keep output $V_O$ substantially unchanged at temperature $T_1$ and $T_2$. In the embodiment, both K and $\gamma$ may be adapted to compensate for changes in external parameters to substantially preserve the relationship of Equation 14.

Figure 6:
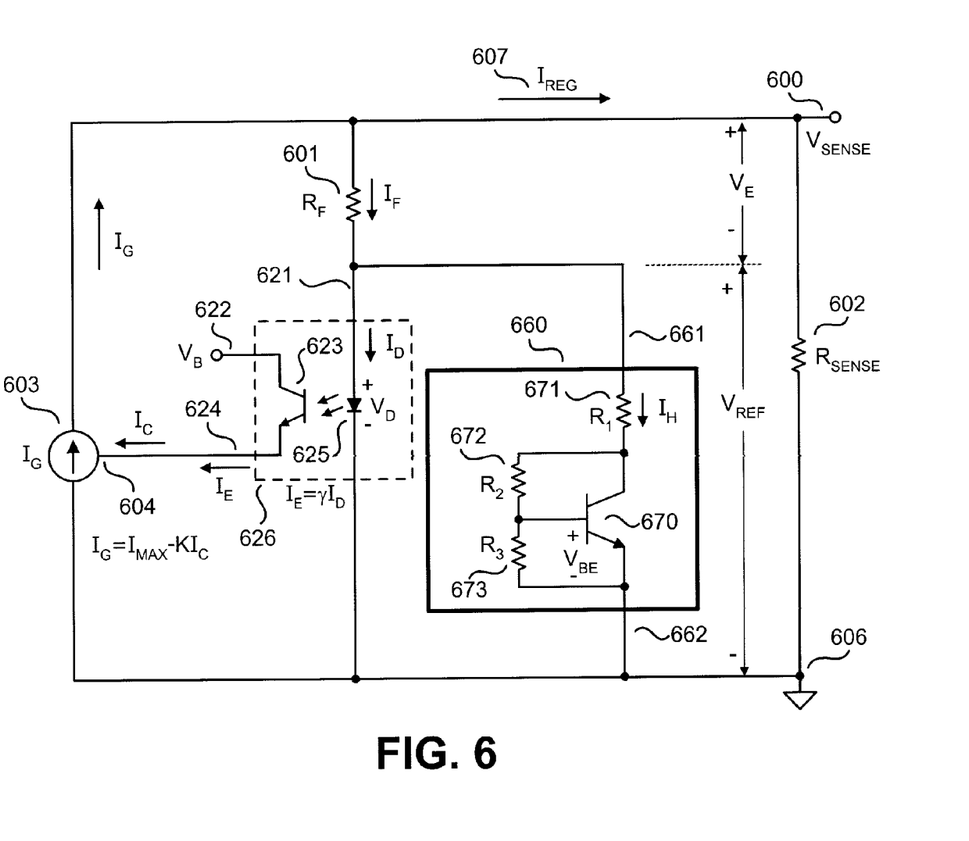
FIG. 6 is a schematic illustration of another embodiment of a voltage regulator with temperature compensation that uses a feedback current to control an output voltage in accordance with the teachings of the present invention.

FIG. 6 shows another embodiment of the present invention that utilizes the forward voltage $V_D$ of the photodiode 625 of the optocoupler 626 as the reference voltage $V_{REF}$ to regulate the voltage $V_{SENSE}$ 600. In one embodiment, the current $I_{REG}$ 607 may be considered to be the output current of a power supply, producing the voltage $V_{SENSE}$ 600 with respect ground reference 606. Voltage $V_{SENSE}$ 600 is also the voltage across current sensing resistor $R_{SENSE}$ 602. The first terminal of network 660 in FIG. 6 is coupled to the anode 621 of photodiode 625. The anode 621 of photodiode 625 is also the input of the current amplifier, which includes optocoupler 626. The second terminal of network 660 in FIG. 6 is coupled to the ground reference 606. The forward voltage $V_D$ of the photodiode 625 of the optocoupler 626 also serves as the reference voltage $V_{REF}$ and the voltage $V_H$ on the first terminal 661 of the network 660 with respect to the second terminal 662 of the network 660. In the embodiment depicted in FIG. 6, the forward voltage $V_D$ is sufficiently greater than the base to emitter voltage $V_{BE}$ of transistor 670 for proper operation of the transistor 670.

In the embodiment of FIG. 6, the current $I_{REG}$ is substantially the same value at two temperatures that correspond to the change $\Delta V_{REF}$ and $\Delta V_{BE}$, all other parameters remaining constant, when the component values of the compensation network 660 are related by the expression in Equation 11.

Changes to other parameters in the circuit such as the gain $\gamma$ of the current amplifier that is the optocoupler 626 and the control gain K of the controlled energy source 603 will alter the relationship required to cancel the variation in the output current $I_{REG}$ 607. In accordance with the teachings of the present invention, compensation network 660 may be employed to keep the output current $I_{REG}$ 607 at substantially the same value at two temperatures.

When variations in K and γ are taken into account, the relationship to keep $I_{REG}$ 607 substantially unchanged at two temperatures or at two sets of other extrinsic parameters is $$I_{F2}(1+K_2\gamma_2)-I_{F1}(1+K_1\gamma_1)=K_2\gamma_2 I_{H2}-K_1\gamma_1 I_{H1} \quad \text{(Equation 15)}$$

where for the circuit in FIG. 6

$$I_F = \frac{V_{SENSE}-V_D}{R_F} \quad \text{(Equation 16)}$$

and $$I_H = \frac{V_D-V_{BE}\left[1+\frac{R_2}{R_3}\left(\frac{\beta}{\beta+1}\right)\right]}{R_1+\frac{R_2}{\beta+1}} \quad \text{(Equation 17)}$$

With K, γ, $V_D$ and $V_{BE}$ at the two sets of extrinsic conditions, values for two of the three resistors $R_1$, $R_2$, and $R_3$ may be selected in the compensation network 660, and then Equation 15 may be solved to determine the value of the remaining resistor. The design of the compensation network 660 is greatly simplified in embodiments where the control gain K of the controlled energy source 603 and the gain γ of the current amplifier that is the optocoupler 626 remain constant, as shown by Equation 11.

Embodiments of the present invention described herein can be used to change a regulated quantity in a desired manner as a result of changes in extrinsic parameters. For example, although it is often the goal to keep a regulated quantity at substantially the same value, various embodiments of the present invention can also be employed to cause the regulated quantity to increase or decrease as the temperature changes if that is the desired behavior.

Various embodiments of the present invention may also be extended to act within the continuous range of extrinsic conditions between the limits of two sets of extrinsic conditions. For example, in the embodiment of FIG. 6 the change in reference voltage $V_{REF}$ is attributed to the natural variation with temperature of the forward voltage $V_D$ of the photodiode 625. Since the characteristic of the base to emitter voltage $V_{BE}$ of the transistor 670 is very similar to the characteristic of the forward voltage $V_D$ of the photodiode 625, network 660 can provide substantially the desired compensation at all temperatures between $T_1$ and $T_2$ in accordance with the teachings of the present invention.

Figure 7:
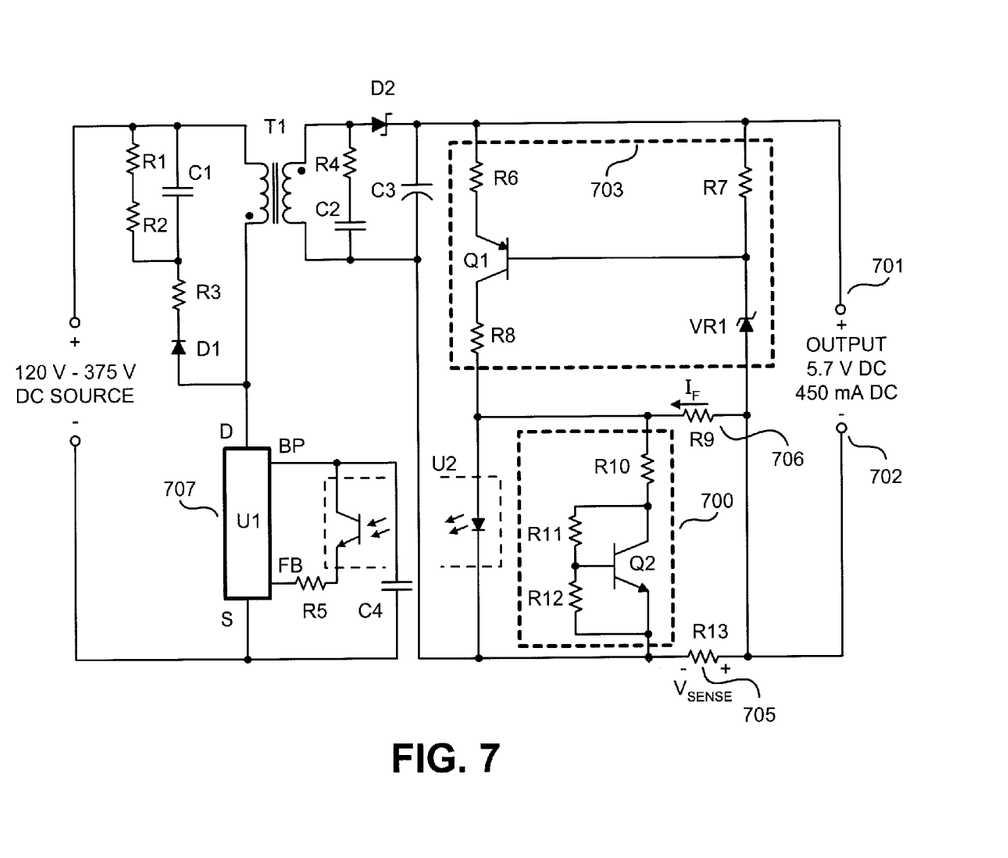
FIG. 7 is a schematic illustration of one embodiment of a switched mode power supply with temperature compensation that uses a feedback current to control an output voltage in accordance with the teachings of the present invention.

FIG. 7 shows yet another embodiment of the present invention included in a power supply in accordance with the teachings of the present invention. In the embodiment of FIG. 7, temperature compensation is provided for a regulated output current from the power supply. In the illustrated embodiment, the power supply is a flyback converter that receives its energy from a source of voltage that is typically between 120 volts DC and 385 volts DC, those values being within the range of full wave rectified voltage from the standard universal AC power source. In one embodiment, the power supply uses an integrated circuit U1 707 that includes a high voltage power switch and essential control circuits, such as for example a LNK354P power supply controller integrated circuit of Power Integrations, Inc. of San Jose, Calif., to produce an output between terminals 701 and 702 that is typical for the operation and charging of batteries in electronic equipment.

The output is a regulated voltage for loads substantially less than a maximum current. The output is a regulated current for voltages substantially less than a minimum voltage.

In operation, the DC voltage source is provided at the input. Elements R1, R2, R3, C1 and D1 are coupled to limit the voltage on integrated circuit 707. An energy transfer element T1 is coupled to receive the DC voltage. In the illustrated embodiment, integrated circuit U1 707 is coupled to a primary winding of the energy transfer element and is switched in response to an output of the power supply. A voltage appears at the secondary winding of the energy transfer element. Elements R4, C2, D2 and C3 perform filtering at the output. The components illustrated within the border 703 in FIG. 7 regulate the output voltage between terminals 701 and 702, and do not take part in the regulation of output current. The components within the border 703 in FIG. 7 can therefore be ignored in the description of this embodiment of the invention that provides temperature compensation for the regulation of output current.

In the depicted embodiment, the power supply regulates the output current between terminals 701 and 702 when the output voltage is substantially less than the regulated output voltage in the same way as the current $I_{REG}$ 607 in FIG. 6 is regulated. Regulation of the output current in FIG. 7 is accomplished by regulation of the voltage $V_{SENSE}$ that appears across current sensing resistor R13 705. Current sensing resistor R13 705 in FIG. 7 corresponds to resistor $R_{SENSE}$ 602 in FIG. 6. A feedback current $I_F$ is conducted by resistor R9 as shown. Resistor R9 706 in FIG. 7 corresponds to resistor $R_F$ 601 in FIG. 6. Compensating network 700 in FIG. 7 corresponds to the compensating network 660 in FIG. 6. Compensating network 700 reduces the change in regulated current from changes in temperature according to the teaching of this invention. For the power supply in FIG. 7 that uses a typical optocoupler U2 and a typical transistor Q2, approximate values of the resistors in a practical application are 200 ohms for R9, 130 ohms for R10, 2500 ohms for R11, 5000 ohms for R12, and 2.4 ohms for R13.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A regulator circuit, comprising:
an energy source including a control input coupled to receive a control current, wherein an output of the regulator circuit is responsive to the control current;
an optocoupler including:
a photodiode coupled to conduct a diode current, wherein the diode current is responsive to the output of the regulator circuit; and
a phototransistor optically coupled to the photodiode to generate an emitter current in response to the diode current; and
a compensation network coupled to the control input of the energy source and to the phototransistor to generate a compensation current in response to an extrinsic parameter of the regulator circuit, such that the control current is a difference between the emitter current and the compensation current, wherein the compensation network includes a bipolar transistor, wherein a voltage $V_{BE}$ between a base and an emitter of the bipolar transistor adjusts by a first amount in response to the extrinsic parameter of the regulator circuit and wherein a reference voltage of the regulator circuit includes a voltage across the photodiode where the reference voltage adjusts by a second amount in response to the extrinsic parameter and wherein the second amount is proportional to the first amount.

2. The regulator circuit of claim 1, wherein the compensation network includes a first terminal and a second terminal, wherein the first terminal is coupled to a node between the control input and an emitter of the phototransistor and wherein the second terminal is coupled to a ground terminal of the regulator circuit.

3. The regulator circuit of claim 1, wherein a collector of the phototransistor is coupled to a bias voltage and wherein the control input is an input terminal of a power supply controller integrated circuit included in the regulator circuit.

4. The regulator circuit of claim 1, wherein an emitter of the phototransistor is coupled to the control input of the energy source.

5. The regulator circuit of claim 1, wherein the compensation network is coupled to adjust the compensation current in response to the voltage $V_{BE}$.

6. The regulator circuit of claim 5, wherein the compensation network further includes first, second, and third resistors, the first resistor coupled between an emitter of the phototransistor and a collector of the bipolar transistor, the second resistor coupled between the collector and the base of the bipolar transistor, and the third resistor coupled between the base and the emitter of the bipolar transistor.

7. The regulator circuit of claim 1, wherein the compensation network consists of the bipolar transistor and first, second and third resistors.

8. A regulator circuit, comprising:
an output responsive to a control current;
a feedback current responsive to the output of the regulator circuit;
a current amplifier that produces an amplified current from an input current received at an input terminal having a reference voltage, wherein the input current includes the feedback current, wherein the control current is a difference between the amplified current and a compensation current, wherein the current amplifier includes an optocoupler having a photodiode and a phototransistor, wherein the photodiode is coupled to receive the input current and the phototransistor is coupled to generate the amplified current; and
a compensation network including a bipolar transistor and first, second, and third resistors, the first resistor coupled between the output terminal of the current amplifier and a collector of the bipolar transistor, the second resistor coupled between the collector and the base of the bipolar transistor, and the third resistor coupled between the base and an emitter of the bipolar transistor, wherein a voltage $V_{BE}$ between the base and the emitter of the bipolar transistor adjusts in response to an extrinsic parameter of the regulator circuit and wherein the compensation network is coupled to adjust the compensation current in response the voltage $V_{BE}$.

9. The regulator circuit of claim 8, wherein the extrinsic parameter of the regulator circuit includes at least one of temperature, ionizing radiation, or aging of the regulator circuit.

10. The regulator circuit of claim 8, wherein the reference voltage of the regulator circuit comprises a voltage across the photodiode of the optocoupler.

11. The regulator circuit of claim 8, wherein the reference voltage is a first reference voltage value in response to a first extrinsic parameter value and wherein the reference voltage is a second reference voltage value in response to a second extrinsic parameter value.

12. The regulator circuit of claim 11, wherein the voltage $V_{BE}$ is a first voltage $V_{BE}$ value in response to the first extrinsic parameter value and wherein the voltage $V_{BE}$ is a second voltage $V_{BE}$ value in response to the second extrinsic parameter value, wherein a difference between the first reference voltage value and the second reference voltage value is proportional to a difference between the first voltage $V_{BE}$ value and the second voltage $V_{BE}$ value.

13. The regulator circuit of claim 12, wherein an output voltage of the regulator circuit is substantially the same under the first extrinsic parameter value as the output voltage under the second extrinsic parameter value.

* * * * *